United States Patent [19]

Araki et al.

[11] Patent Number: 4,524,456
[45] Date of Patent: Jun. 18, 1985

[54] METHOD FOR COMPRESSING DATA OF TWO-VALUE PICTURE IMAGE

[75] Inventors: Shuichi Araki; Hideshi Hashiyama, both of Kyoto, Japan

[73] Assignee: Dainippon Screen Seizo Kabushiki Kaisha, Kyoto, Japan

[21] Appl. No.: 440,559

[22] Filed: Nov. 10, 1982

[30] Foreign Application Priority Data

Nov. 11, 1981 [JP] Japan .................. 56-180649

[51] Int. Cl.³ .............................................. G06K 9/36
[52] U.S. Cl. .................................. 382/56; 358/260
[58] Field of Search ................. 382/56; 358/260, 261, 358/133, 138, 263

[56] References Cited

U.S. PATENT DOCUMENTS 3,921,135 11/1975 Komaru et al. ..................... 382/56
3,980,809 9/1976 Cook ................................... 358/260
4,068,224 1/1978 Bechtle et al. ..................... 358/260

Primary Examiner—Leo H. Boudreau
Assistant Examiner—Michael Murray
Attorney, Agent, or Firm—Lackenbach Siegel Marzullo Presta & Aronson

[57] ABSTRACT

A method for compressing data of two-value picture image such as an original character pattern for a phototype setting by an electronic computer, wherein an original picture image is divided into a plurality of divisional picture images by division lines and then intersections between the division lines and outlines of a character area of each divisional picture image are detected to determine start and end points, and wherein, while the outlines of the character area of each divisional picture image are traced from the start points to the end points, characteristic points are selected, and then the outlines of the character areas of the adjacent divisional picture images are connected at the start and the end points.

2 Claims, 10 Drawing Figures

METHOD FOR COMPRESSING DATA OF TWO-VALUE PICTURE IMAGE

BACKGROUND OF THE INVENTION

The present invention relates to a method for compressing data of two-value picture image, especially digital data of an original character pattern for a phototype setting by an electronic computer.

In a conventional method, a digital original character pattern for a phototype setting by an electronic computer is composed by a dot matrix having a high density since such a original character pattern is necessarily enlarged, differing from a character for a Chinese character word processor.

When the original character pattern expressed by a bit pattern of the dot matrix having the high density is processed as in the form of the bit pattern, a great number of bit numbers are required for storing one character. For example, a high density of $480 \times 480 = 230400$ bits is required to store one original character pattern for the phototype setting by the electronic computer.

As concerns the original character patterns for the phototype setting by the electronic computer, the style of type is important as well as the meaning as the normal characters, and various styles of type are required. Hence, the original character patterns are prepared as sets or fonts of styles of types such as the Ming type, the Gothic type, and so forth. Further, it is desired that the sets of styles of types of such original character patterns for the phototype setting by the electronic computer are filed so as to be always looked up.

However, as described above, when the bit pattern of one character is stored as the character data as it is, the very large memory capacity for filing the original character patterns is required. Accordingly, instead of storing the bit pattern as it is, the data for each character has been proposedly compressed by a zone compression technique for the picture electrical wireless transmission processing.

However, in a previously proposed run length system, only 20-30% amount of compression rate can be obtained. Meanwhile, in a vector system, several per cent of high compression can be obtained, but in a conventional compression processing the vector is obtained in the almost manually operation. Therefore, when the vector method is applied to the original character patterns for the phototype setting by the electronic computer, a lot of time and labor are necessary to perform the compression of the set of the original character patterns.

For example, in a conventional vector system, the character pattern is enlarged to a certain size so that the manual operation may be carried out, and points for producing the vectors by which the outline of the character pattern is approximated by straight lines, are plotted manually by using a digitizer.

In order to express the character pattern by the vectors, a lot of line segments are necessary, and particularly in case of the Ming-style type containing many curves, there are great many of the plotting points. Hence, in this case, a lot of time and labor are required, and further the great skill is necessary to plot such points.

Further, since this plotting operation is performed manually by the digitizer, in order to minimize the plotting errors, the character pattern for inputting, which is enlarged as far as possible, should be prepared. Further, the reforming operation of the finished character pattern is necessary at the end.

SUMMARY OF THE INVENTION

It is an object of the present invention to provide a method for compressing data of two-value picture image, free from the aforementioned defects and inconveniences, which is developed on the basis of the above described vector method, which is capable of performing higher compression rate than the conventional vector method, in a short time without the plotting error, and which does not require the enlargement of the character pattern and the manual plotting of such many points.

According to the present invention there is provided a method for compressing data of two-value picture image, comprising the steps of (a) dividing an original picture image into a plurality of divisional picture images by division lines, (b) detecting intersections between the division lines and outlines of a character area of each divisional picture image to determine the detected intersections as start and end points, (c) selecting characteristics points while the outlines of the character area of each divisional picture image are traced from the start points to the end points, and (d) connecting the outlines of the character areas of the adjacent divisional picture images at the start and the end points.

BRIEF DESCRIPTION OF THE DRAWINGS

In order that the present invention may be better understood, a preferred embodiment thereof will be described in terms of the accompanying drawings, in which.

DESCRIPTION OF THE PREFERRED EMBODIMENT

Figure 1:
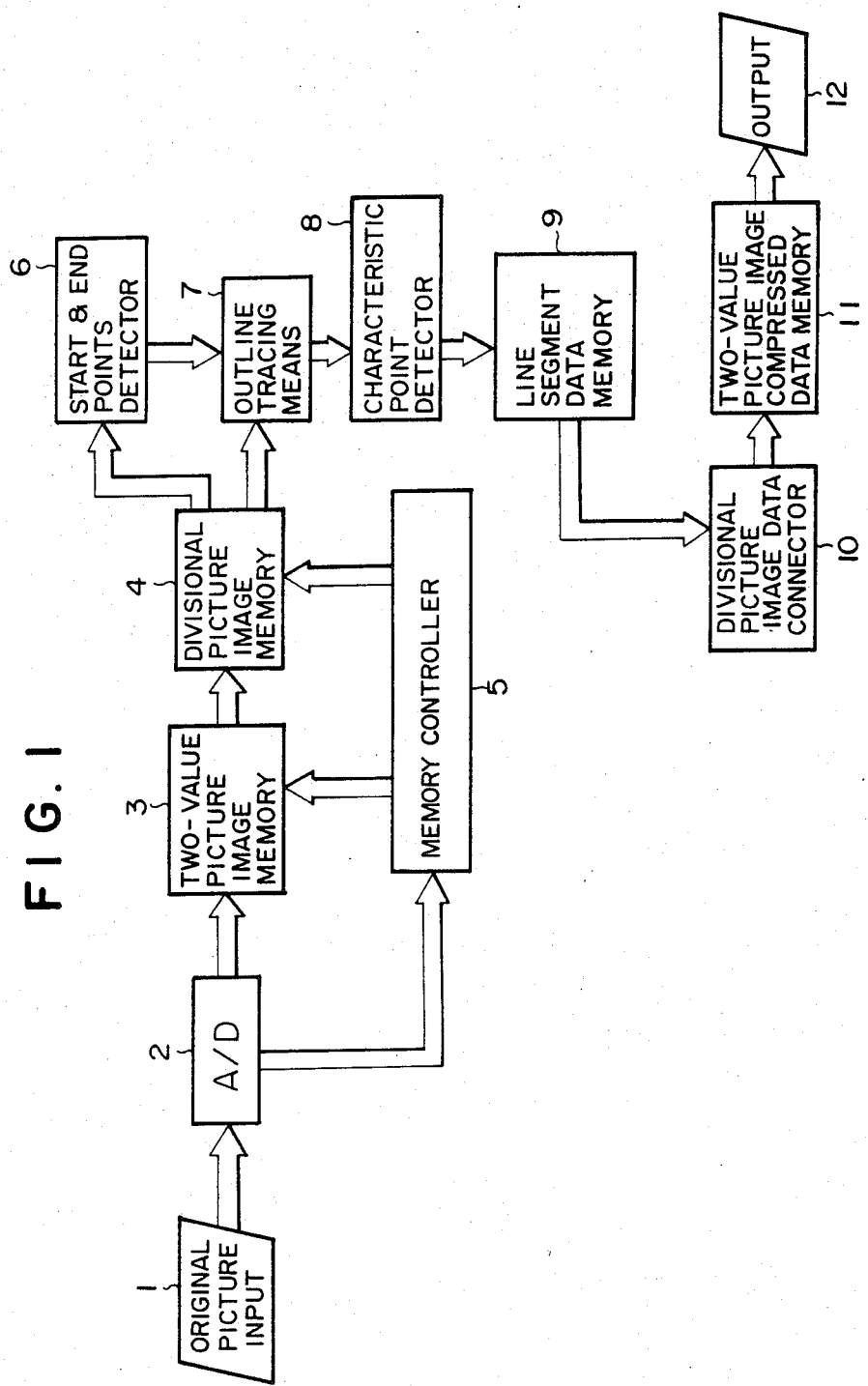
FIG. 1 is a block diagram of a data compressing machine which performs a method according to the present invention.

Referring to the drawings there is shown a data compressing machine which performs a method according to the present invention.

An original picture pattern is scanned photoelectrically in an original picture input means 1 to obtain analog picture signal, and then the analog picture signal is sent to an analog-digital converter 2, hereinafter referred to as A/D converter, and is converted therein into digital picture signals. The digital picture signals are sent to a two-value picture image memory 3, and are stored therein.

Figure 2:
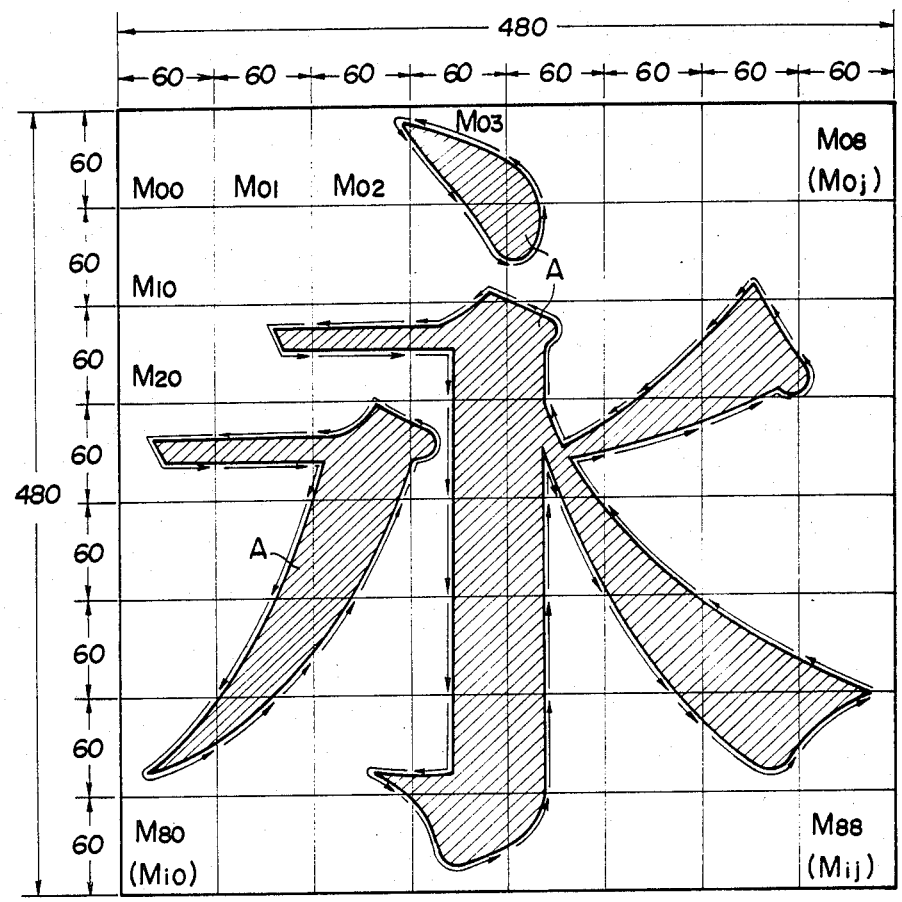
FIG. 2 shows a bit pattern of an original picture image stored in a memory, which is to be compressed according to the present invention.

The data of the original picture pattern of the two-value picture image such as a character pattern A, which is to be stored into the two-value picture image memory 3 and is to be compressed, is composed of a bit pattern of a dot matrix, as shown in FIG. 2. The two-value picture image memory 3 comprises a plurality of memory blocks $M_{00}-M_{ij}$ aligned in a matrix, and each of the memory blocks $M_{00}-M_{ij}$ stores the bit pattern of one of divisional picture images which are obtained by dividing the two-value picture image, hereinafter referred to as the original picture image, into a plurality of divisions.

Then, each divisional picture image read out of the two-value picture image memory 3 per each memory block is consecutively transferred to a divisional picture image memory 4 and is stored therein per each memory block by a control signal generated by a memory controller 5.

The memory controller 5 controls the writing, the reading and the addresses of the data into and out of the memories 3 and 4 according to a flow chart described hereinafter.

Figure 3:
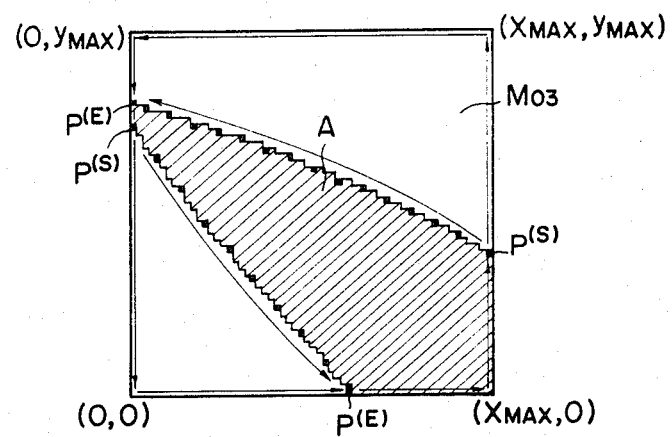
FIG. 3 shows a bit pattern enlarged of one divisional picture image, included in the bit pattern of FIG. 2, which is transferred to another memory.

FIG. 3 shows an enlarged bit pattern of one divisional picture image stored in the divisional picture image memory 4, corresponding to the bit pattern of the memory block $M_{03}$ of FIG. 2. Then, depending on the bit pattern read out of the divisional picture image memory 4, intersections between the outlines of the character area A of the divisional picture image and the division lines which divide the original picture image into the divisional picture images are detected by a start and end points detector 6 as start and end points $P^{(S)}$ and $P^{(E)}$ for automatically tracing the outlines.

Then, the outlines of the character area A of the bit pattern for each divisional picture image are traced from the start points $P^{(S)}$ to the end points $P^{(E)}$ in an outline tracing means 7. While the outlines of the character area A are traced, the characteristics of the changes of the outlines are detected by a characteristic point detector 8 to obtain a proper number of characteristic points consecutively on and along the outlines. Hence, the data of the coordinates of the selected characteristic points aligned from the start points $P^{(S)}$ to the end points $P^{(E)}$ become the compressed data of the bit pattern of the divisional picture image.

Thus the obtained compressed data of each divisional picture image is continuously stored into a line segment data memory 9 in order of the processing. When the all memory blocks $M_{00}-M_{ij}$ are finished, the outlines of the character areas A divided of the divisional picture images are connected at the corresponding start and end points $P^{(S)}$ and $P^{(E)}$, thereby obtaining the compressed data for the original picture image. Then, the compressed data for the original picture image is stored into a two-value picture image compressed data memory 11.

Then, the compressed data for the original picture image read out of the two-value picture image compressed data memory 11 is properly sent to an output means 12 for displaying a reproduction picture pattern on a monitor according to the compressed data, or storing the compressed data into a data filing means. The above described process is shown by the flow chart in FIG. 4.

Figure 4:
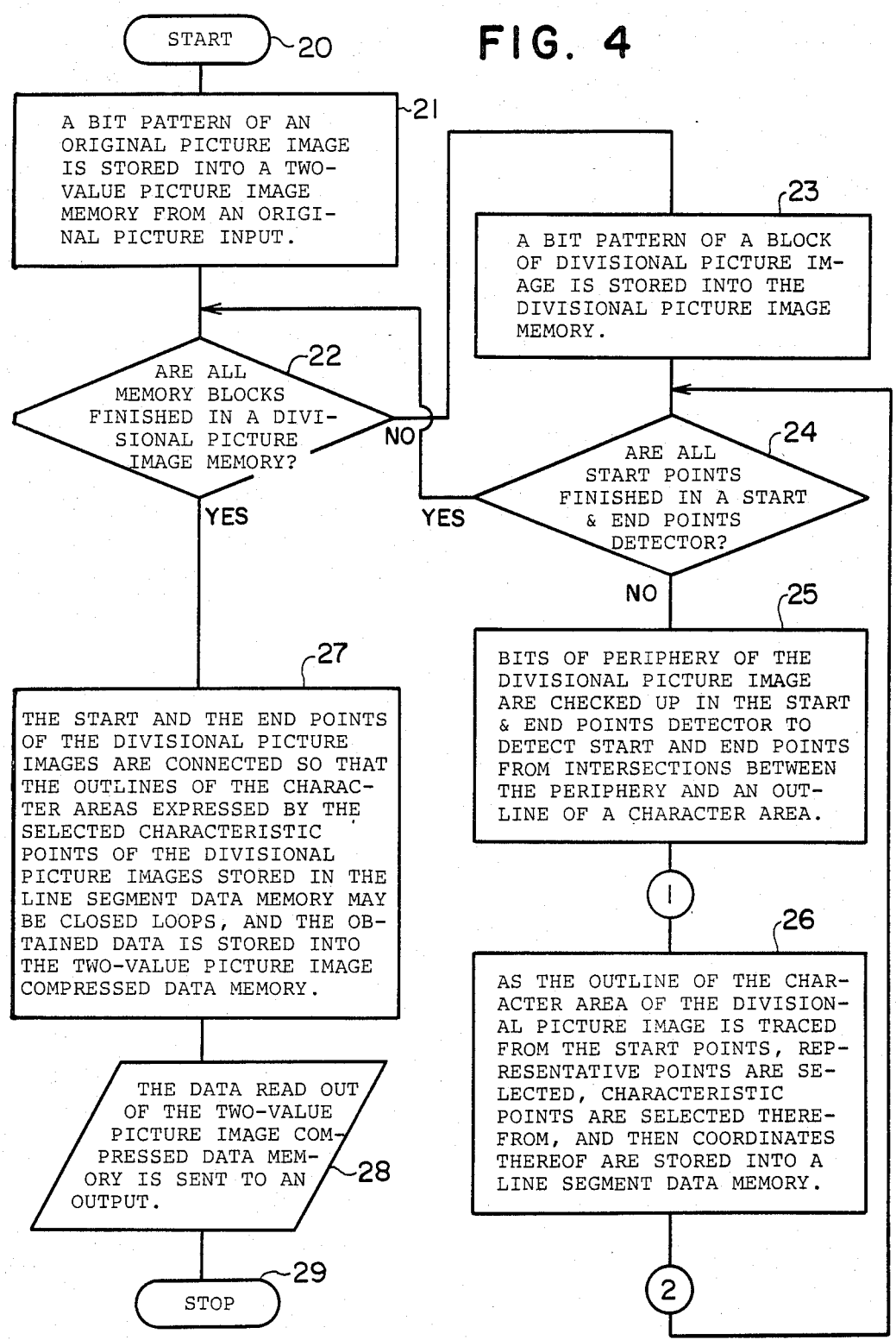
FIG. 4 is a flow chart of the operations which are carried out in the data compressing machine of FIG. 1.

In the flow chart of FIG. 4, the process for detecting the start and the end points $P^{(S)}$ and $P^{(E)}$ in the start and end points detector 6 corresponds to the step 25, and the example of this process is described in the followings.

That is, the address space of the divisional picture image memory 4 is adapted to have the same construction as that of each of the memory blocks $M_{00}-M_{ij}$ in the two-value memory 3, and hence the peripheral addresses of the divisional picture image memory 4 correspond to the periphery of the divisional picture image.

As shown in FIG. 3, the division lines of the divisional picture images and the outlines of the character areas A thereof are detected as the lines of the picture elements since the bit pattern of the divisional picture image is composed of a matrix of the picture elements. The peripheral addresses of the divisional picture image memory 4 are addressed counterclokwise from the origin (0,0) to detect the picture elements including the intersections between the division lines and the outlines of the character area A by detecting the variations of the picture element bits in the peripheral addresses of the bit pattern.

In this embodiment, it is defined that the picture element bit of the character area A represents "1" and the picture element of the other area does "0".

That is, the picture element bits of the pheripheral addresses of the bit pattern are consecutively read out of the divisional picture image memory 4 one by one counterclockwise, and when the picture element bit is turned round from "1" to "0", it is determined to the start point $P^{(S)}$, and when the picture element bit is turned round from "0" to "1", it is determined to the end point $P^{(E)}$.

The coordinates $(x_i, y_i)$ of the obtained start and end points $P^{(S)}$ and $P^{(E)}$ are once reserved in a proper register of the start and end points detector 6, and then are sent to the outline tracing means 7 as the initial and the end values thereof.

The process in the outline tracing means 7 corresponds to the step 26 of the flow chart shown in FIG. 4.

Figure 5:
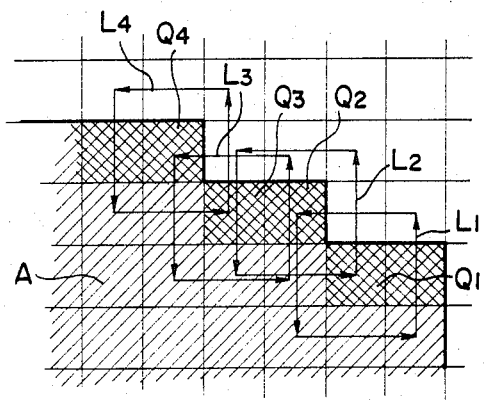
FIG. 5 is a fragmentary enlarged view of an outline of a character area of the bit pattern, for the explanation of the tracing of the outline by an outline tracing means of FIG. 1.

FIG. 5 shows an outline of the character area A of the bit pattern for the explanation of the tracing of the outline by the outline tracing means 7. First, the picture element bits surrounding the noticed picture element bit $Q_1$ including the outline of the character area A are detected in the counterclockwise direction, as shown by an arrow of a loop $L_1$, so that each of the picture element bits may represents "1" or "0". Then, when the value is turned round from "0" to "1", the picture element bit having the value "1" is determined to the following picture element bit $Q_2$ including the outline of the character area A.

Then, in respect of the noticed picture element bit $Q_2$ the same operation as the picture element bit $Q_1$ is carried out via a loop $L_2$, thereby obtaining the third picture element bit $Q_3$. This operation is repeated to obtain the picture element bits including the outline of the character area A, i.e. tracing the outline of the character area A.

As the outline of the character area A is traced, some of the picture element bits $Q_1, Q_2, \ldots$ are selected as representative points, and then some of the representative points are selected as the characteristic points by inspecting the variation of the alignment of the representative points.

Figure 8:
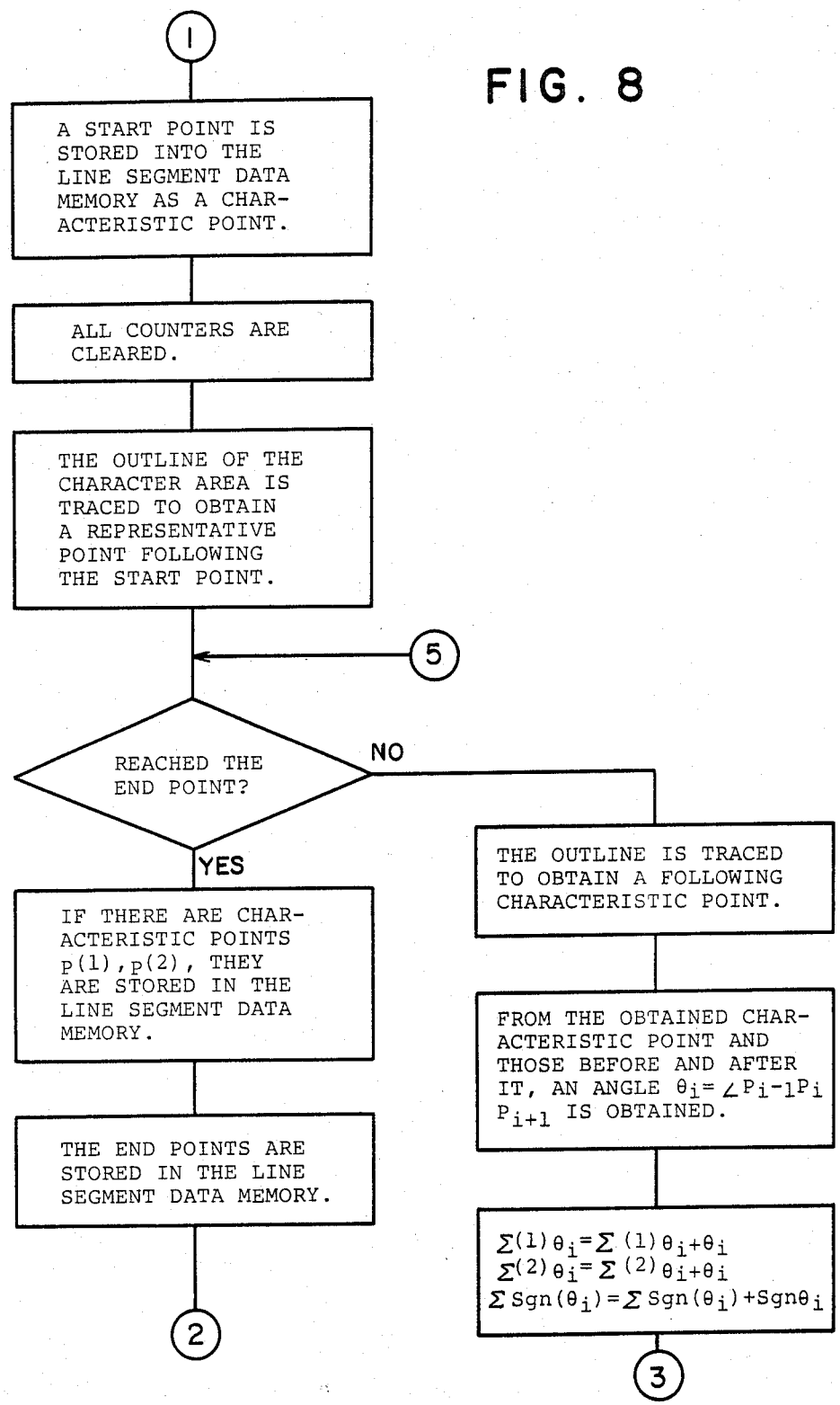
FIGS. 8-10 are flow charts showing the step 26 of FIG. 4, in detail.
Figure 9:
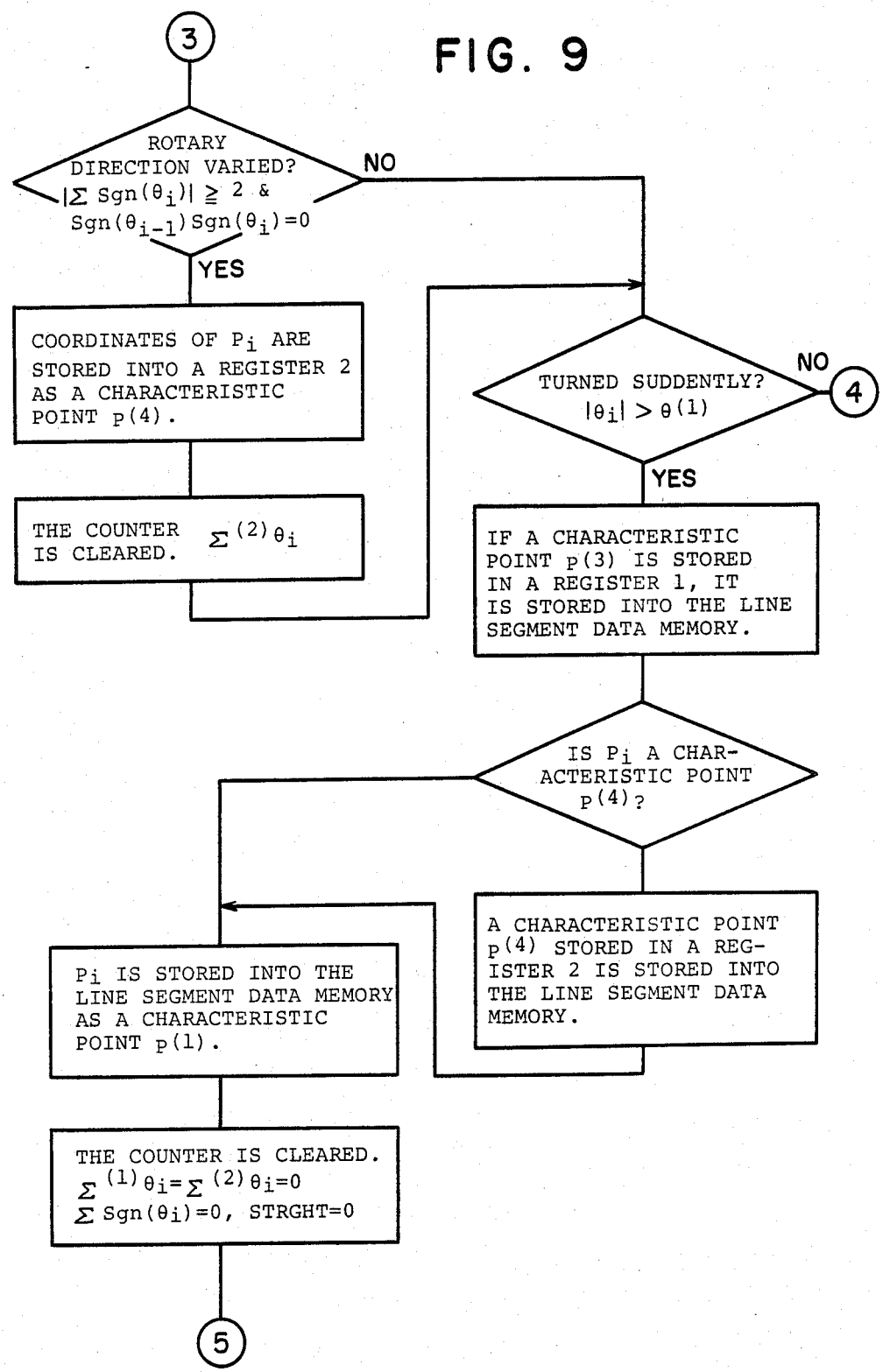
Figure 10:
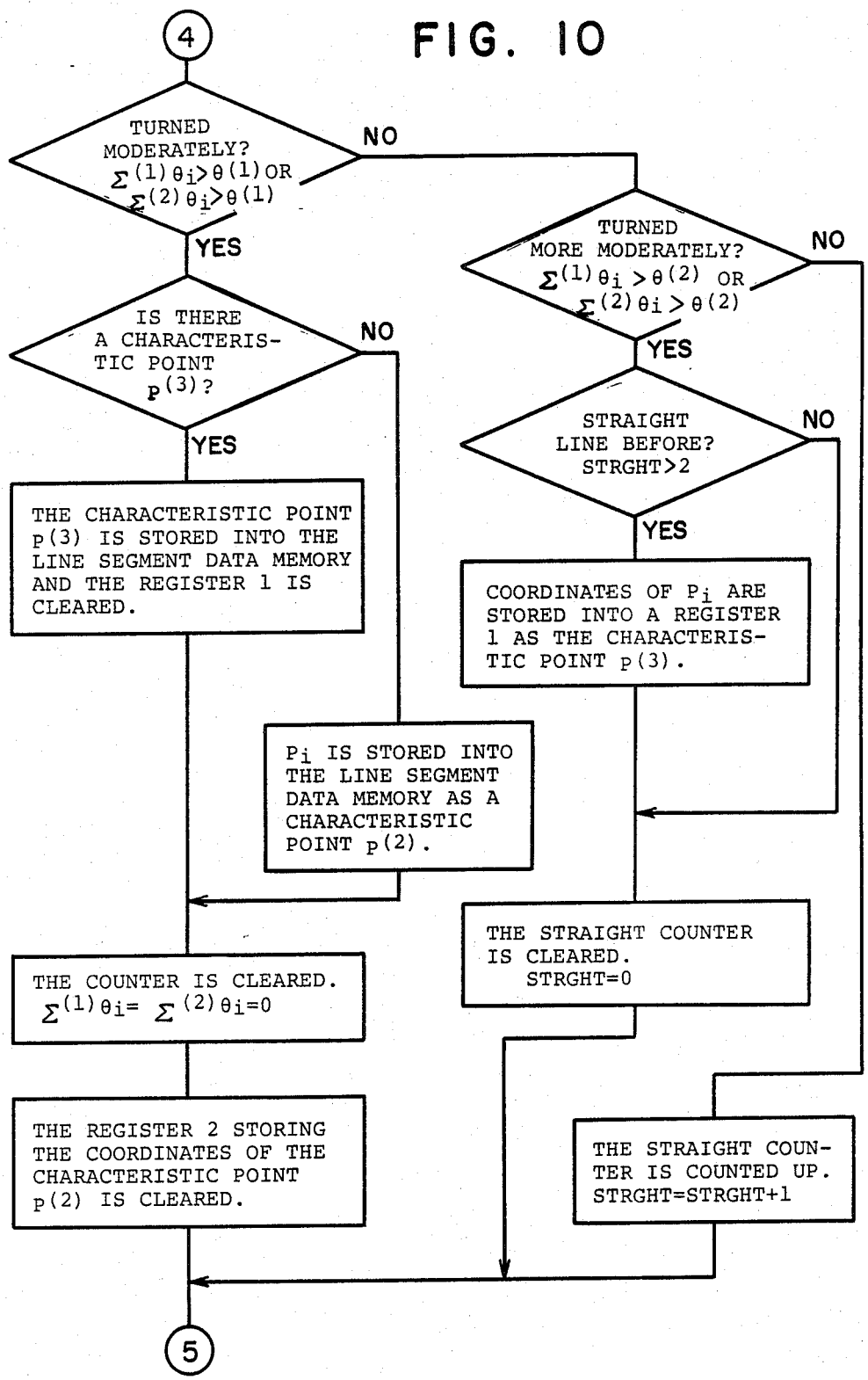

One embodiment of the process for selecting the characteristic points by the characteristic point detector 8 is shown in the flow charts of FIGS. 8–10.

Figure 6:
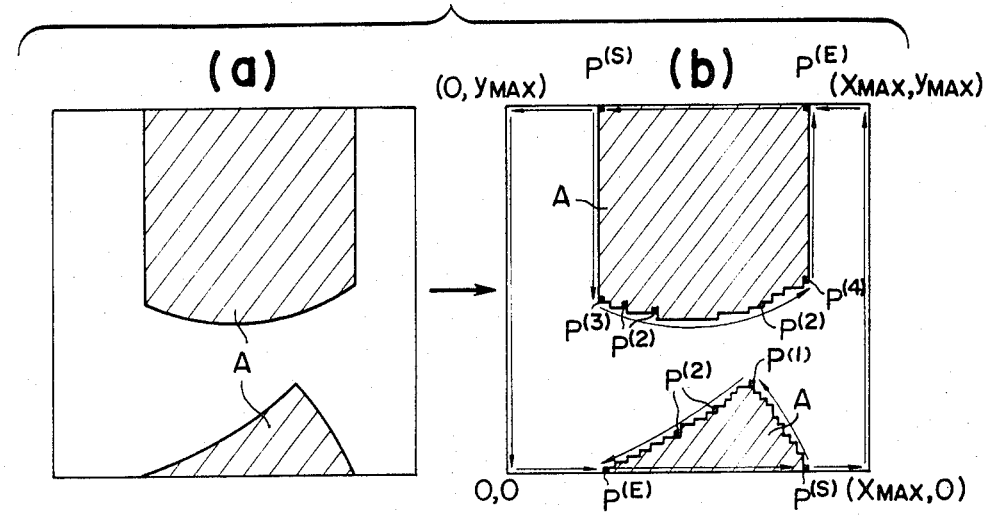
FIG. 6 shows character areas including characteristics points, and the bit pattern thereof in the memory.

The characteristic points are classified into four kinds depending on the conditions of the variation, and one example of the bit pattern including such four kinds of the characteristic points is shown in FIG. 6.

FIG. 6a shows another divisional picture image to be two-valued, and FIG. 6b shows a bit pattern of the divisional picture image of FIG. 6a, stored in the divisional picture image memory 4, including the four kinds of characteristic points. In FIG. 6b, arrows show the directions of the inspection of the picture element bit.

The definition of the classification of the characteristic points is performed as below:

$P^{(1)}$: a point where the direction of the outline is changed suddenly;

$P^{(2)}$: a point where the outline is changed moderately in one direction;

$P^{(3)}$: a point where the outline is changed from a straight line to a curved line; and $P^{(4)}$: a point where the outline is changed from a curved line to a straight line.

The selection of these characteristic points is carried out in the characteristic point detector 8 as follows.

First, prior to the inspection of the variation of the outline, the representative points are selected along the outline. The representative points $P_i$ are selected from the picture element bits including the outline of the character area A every certain number of picture element bits when the outline is traced from the start point $P^{(S)}$ by the outline tracing means 7, as described above, with the result of their coordinates $P_i=(x_i, y_i)$ The interval of the picture element bits for selecting the representative points $P_i$ is determined properly depending on the desired data compression rate, the faithfullness, and so forth. For instance, when the interval is widened, the data compression rate with reference to the same picture image increases but the faithfullness is lowered. Therefore, it is determined depending on the extent of importance of the data compression rate or the faithfullness of the reproduction picture image. In this embodiment, the interval is determined to four bits.

Next, the characteristic points $P^{(1)}$, $P^{(2)}$, $P^{(3)}$ and $P^{(4)}$ are selected from the representative points $P_i$ except the start and the end points $P^{(S)}$ and $P^{(E)}$.

Figure 7:
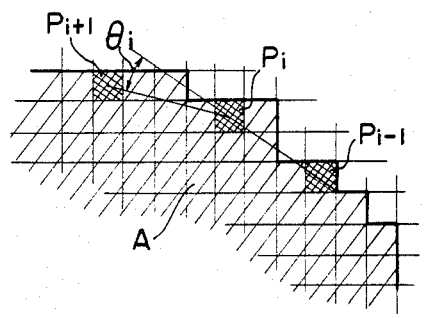
FIG. 7 is a fragmentary enlarged view of an outline of a character area of the bit pattern, for explaining a relation of representative points aligned, in a characteristics point detector of FIG. 1.

First an angle $\theta_i$ of the two vectors $\overrightarrow{P_{i-1}P_i}$ and $\overrightarrow{P_iP_{i+1}}$ of the two adjacent representative points $P_{i-1}$ and $P_{i+1}$ with reference to the representative point $P_i$, except the start and the end points $P^{(S)}$ and $P^{(E)}$ is obtained, as shown in FIG. 7, in the following.

$$\theta_i = \angle P_{i-1}P_iP_{i+1} = \text{SIN}^{-1}\left(\frac{\overrightarrow{P_{i-1}P_i} \times \overrightarrow{P_iP_{i+1}}}{|\overrightarrow{P_{i-1}P_i}| \cdot |\overrightarrow{P_iP_{i+1}}|}\right)$$

From this angle $\theta_i$ the characteristic points $P^{(1)}$, $P^{(2)}$, $P^{(3)}$ and $P^{(4)}$ are determined by the following discrimination methods:

(1) A characteristic point $P^{(1)}$ (a point where the direction of the outline is changed suddenly):

When the angle $\theta_i$ for the representative point $P_i$ is larger than the predetermined angle $\theta^{(1)}$, $P_i$ is selected as $P^{(1)}$. $|\theta_i| > \theta^{(1)}$ The angle $\theta^{(1)}$ is determined as a fixed vale such as 30°.

(2) A characteristic point $P^{(2)}$ (a point where the outline is changed moderately in one direction):

When the sum of the angles $\theta_i$ from the representative point $P_m$ to the representative point $P_{m+n}$ is larger than the predetermined angle of $\theta^{(1)}$, $P_{m+n}$ is selected as $P^{(2)}$.

$$\left|\sum_{i=m}^{n} \theta_i\right| > \theta^{(1)}$$

The initial representative point $P_m$ for starting the addition is the start point $P^{(S)}$, the previous characteristic point $P^{(1)}$ or the characteristic point $P^{(2)}$. When an inflection point (symbols + and − indicating the turning direction of the outline is changed) appears after these points, the inflection point is determined to the initial representative point $P_m$.

(3) A characteristic point $P^{(3)}$ (a point where the outline is changed from a straight line to a curved line):

When a plurality (e.g. at least three) of representative points $P_m$-$P_{m+n}$ continue substantially on a straight line and the following representative point $P_{m+n+1}$ is not discriminated as the characteristic point $P^{(1)}$ but satisfies the condition for the characteristic point $P^{(2)}$, $P_{m+n+1}$ is selected as $P^{(3)}$.

$$\left|\sum_{i=m}^{n} \theta_i\right| < \theta^{(2)}, \quad n - m \geqq 3$$

$$\theta^{(1)} > \left|\sum_{i=m}^{n+1} \theta_i\right| > \theta^{(2)}$$

The predetermined angle $\theta^{(2)}$ is a fixed value for discriminating the outline to be a straight line, and is given by the angle when the representative point $P_i$ is dislocated one bit from the straight line. That is, $\theta^{(2)} = \tan^{-1}(1/\text{distance between two representative points}) = \tan^{-1}\frac{1}{4} = 14°$ (4) A characteristic point $P^{(4)}$ (a point where the outline is changed from a curved line to a straight line):

When a plurality (e.g. at least two) of representative points $P_m$-$P_{m+n}$ turn in the same direction continuously and then the following representative points (e.g. at least two) continue substantially on and along a straight line, $P_{m+n}$ is selected as $P^{(4)}$.

$$\left|\sum_{i=m}^{n} \text{Sgn}(\theta_i)\right| \geqq 2 \text{ and } \text{Sgn}(\theta_{m+n-1}) \cdot \text{Sgn}(\theta_{m+n}) \leqq 0$$

In this case, $\text{Sgn}(\theta_i)$ expresses a three-value code "1", "0" or −1 corresponding to the symbol +, 0 or − which indicates the turning direction of the outline such as the counterclockwise direction, the straight direction or the clockwise direction, for counting the number of such symbols.

$$\text{Sgn}(\theta_i) = \begin{cases} 1 & (\text{when } \theta_i > 0) \\ 0 & (\text{when } \theta_i = 0) \\ -1 & (\text{when } \theta_i < 0) \end{cases}$$

In FIGS. 8–10 there are shown flow charts of one embodiment of a method for selecting the characteristic points $P^{(1)}$, $P^{(2)}$, $P^{(3)}$ and $P^{(4)}$ according to the above described discrimination conditions in the character point detector 8. In the flow charts of FIGS. 8–10, symbols appeared therein denote in followings.

$\theta_i$: an angle $\angle P_{i-1}P_iP_{i+1}$ produced by two vectors $\overline{P_{i-1}P_i}$ and $\overline{P_iP_{i+1}}$ of the two adjacent representative points $P_{i-1}$ and $P_{i+1}$ positioned just before and after the noticed representative point $P_i$;

$\Sigma^{(1)}\theta_i$: a counter which puts up the sum of the angles $\theta_i$ for the representative points from the characteristic point selected immediately before to the noticed representative point;

$\Sigma^{(2)}\theta_i$: a counter which puts up the sum of the angles $\theta_i$ for the representative points from the inflection point discriminated immediately before to the noticed representative point;

Sgn $\theta_i$: a three-value code "1" for the counterclockwise direction, "0" for the straight direction, or "$-1$" for the clockwise direction at the noticed representative point;

$\Sigma$Sgn $\theta_i$: a counter which puts up the sum of the three-value codes for the turning directions from the characteristic point selected immediately before to the noticed representative point;

STRGHT: a counter which shows a straight line from the characteristic point selected immediately before to the noticed representative point, discriminated according to $\theta_i < \theta^{(2)}$;

$\theta^{(1)}$: an angle for discriminating a curved line; and $\theta^{(2)}$: an angle for discriminating a straight line.

As shown in the flow charts of FIGS. 8–10, the characteristic points $P^{(1)}$–$P^{(4)}$ are selected in order of the tracing of the outline from the start point $P^{(S)}$, and a combination of the coordinates $(x_i, y_i)$ of the characteristic points $P^{(1)}$–$P^{(4)}$ are stored in the line segment data memory 9 as the compressed data of the divisional picture image.

The coordinates of the points stored in the line segment data memory 9 are converted into the original coordinates of the bit pattern of FIG. 2 depending on the block numbers 00-ij of the memory blocks $M_{00}$–$M_{ij}$ of the two-value picture image memory 3.

That is, the coordinates of the characteristic points $P^{(1)}$–$P^{(4)}$ and the start and the end points $P^{(S)}$ and $P^{(E)}$ are stored into the line segment data memory 9 as the compressed data every memory block $M_{00}, \ldots,$ or $M_{ij}$, usually in order of the start point $P^{(S)}$, the characteristic points $P^{(1)}$–$P^{(4)}$ and the end point $P^{(E)}$, i.e. the line segment data of each divisional picture image of the bit pattern of the original picture is stored in the line segment data memory 9 so that the start and the end points $P^{(S)}$ and $P^{(E)}$ may be both the ends of each line segment.

The compressed data of all memory blocks $M_{00}$–$M_{ij}$ are gathered in the line segment data memory 9, and the start and the end points $P^{(S)}$ and $P^{(E)}$ of the outlines of the character area A of each divisional picture image are connected to the end and the start points $P^{(E)}$ and $P^{(S)}$ of the outlines of the character area A of another divisional picture image adjacent thereto in the divisional picture image data connector 10, thereby obtaining the compressed data of the bit pattern of the original picture image of FIG. 2, as the combinations of the coordinates of the characteristic points aligned on the outlines in the one directions, in which the outlines of the character areas A divided into the divisional picture images are connected at the start and the end points $P^{(S)}$ and $P^{(E)}$.

The outlines of the character areas A of the original picture image are formed in the closed loops, as shown in FIG. 2. When the outline of the character area is traced in the counterclockwise direction, the inside of the loop is black, i.e. the character area A, and in the clockwise direction, the inside of the loop is white, i.e. not the character area. When the loops are overlapped, the white loop takes precedence over the other.

It is readily understood, according to the present invention, that the present invention is capable of performing the data compression of the character pattern quickly, exactly and accurately, and reducing the manual operation largely. Further, according to the present method the capacity of the memory can be reduced largely.

Although the present invention has been described in connection with the accompanying drawings, however, it will be apparent to those skilled in the art that many changes and modifications can be made thereby without departing from the spirit and scope of the present invention as set forth herein.

What is claimed is:

1. A method for compressing data of two-value picture image, comprising the steps of:
   (a) storing an original picture image as electric signals in a memory partitioned into a plurality of regions bounded by sets of division lines for receiving divisional picture images, said sets being perpendicular to one another and each set comprising a plurality of lines;
   (b) detecting stored electric signals designating intersections between the division lines and outlines of a character area of each divisional picture image, individual ones of said electric signals being found as start and end points of segments of the character outlines;
   (c) comparing electric signals designating coordinate values of one part of a character outline with signals designating coordinate values of the locations of changes in slope, such locations being characteristic points; tracing the outlines of the character area of each divisional picture image from the start points to the end points; and
   (d) imaging the outlines of the character areas of the adjacent divisional picture images at the start and the end points.

2. A method as defined in claim 1, wherein the characteristic points of the outline and selected depending on a direction of two vectors of two point of said segment adjacent to a selected representative point and an angle formed by the vectors of the selected point and another point positioned immediately before it, such selected points being selected from picture element bits including the outline of the character area every certain number of the picture element bits, including the start and the end points.

* * * * *